(12) United States Patent
Price et al.

(10) Patent No.: US 6,752,176 B1
(45) Date of Patent: Jun. 22, 2004

(54) ADJUSTABLE ADAPTER FOR PIPE INSULATION CLADDING

(76) Inventors: Todd Price, 3973 Annabelle Ave., Roseville, CA (US) 95661; Michael Bellah, P.O. Box 722, Meadow Vista, CA (US) 95722

(*) Notice: Subject to any disclaimer, the term of this patent is extended or adjusted under 35 U.S.C. 154(b) by 0 days.

(21) Appl. No.: 10/339,079

(22) Filed: Jan. 8, 2003

(51) Int. Cl.[7] ................................................ F16L 55/10
(52) U.S. Cl. ................ 138/109; 138/96 R; 138/148; 138/149; 285/47
(58) Field of Search .................... 138/149, 110, 138/148, 109, 96 R, 128, 89, 156, 104, 103; 285/45, 47

(56) References Cited

U.S. PATENT DOCUMENTS

| | | | | |
|---|---|---|---|---|
| 1,722,676 A | * | 7/1929 | Parker | 285/148.23 |
| 2,449,754 A | * | 9/1948 | Seitz | 285/4 |
| 2,695,254 A | | 11/1954 | Isenberg | 138/109 |
| 2,872,947 A | * | 2/1959 | Isenberg | 138/109 |
| 3,903,931 A | | 9/1975 | Moulin | 138/148 |
| 4,004,394 A | | 1/1977 | Bennett | 52/741 |
| 4,333,660 A | * | 6/1982 | Cupit | 277/630 |
| 4,449,554 A | | 5/1984 | Busse | 138/149 |
| 4,563,847 A | * | 1/1986 | Hasty | 52/219 |
| D290,990 S | | 7/1987 | Izzi | D23/1 |
| 4,869,293 A | | 9/1989 | Botsolas | 138/96 R |
| 5,010,700 A | * | 4/1991 | Blair | 52/199 |
| 5,143,408 A | * | 9/1992 | Holtsmark | 285/93 |
| 5,222,334 A | * | 6/1993 | Hasty | 52/100 |
| 5,503,191 A | | 4/1996 | Morris | 138/111 |
| 5,503,193 A | * | 4/1996 | Nygaard | 138/149 |
| 6,116,290 A | | 9/2000 | Ohrn | 138/149 |

* cited by examiner

*Primary Examiner*—Patrick Brinson
(74) *Attorney, Agent, or Firm*—Heisler & Associates

(57) ABSTRACT

An adapter blank is provided which is adjustable in size to join generally tubular structures of different diameters, such as pipe insulation cladding, together. The adapter blank includes a tapering wall having a rim defining a larger diameter matching larger diameter pipe insulation cladding to be joined by the adapter. An overlapping edge extends away from the rim. Graduations are located at various different constant distances away from the rim. Indicia, such as numbers, are preferably provided adjacent at least some of the graduations to indicate the various different smaller diameter pipe insulation cladding sizes. The adapter blank is cut along the graduation corresponding with the smaller diameter pipe insulation cladding to be joined with the adapter. The adapter blank is thus modified into a finished adapter ready for installation joining together pipe insulation cladding, or other tubular structures of different diameters; or terminating an end of pipe, tank, vessel or other tubular structure.

38 Claims, 2 Drawing Sheets

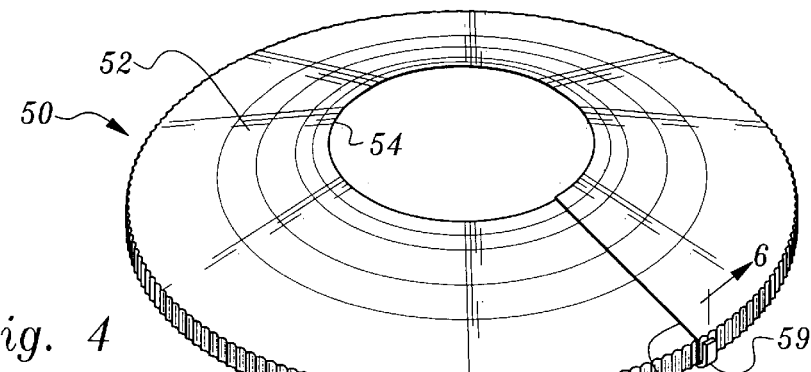
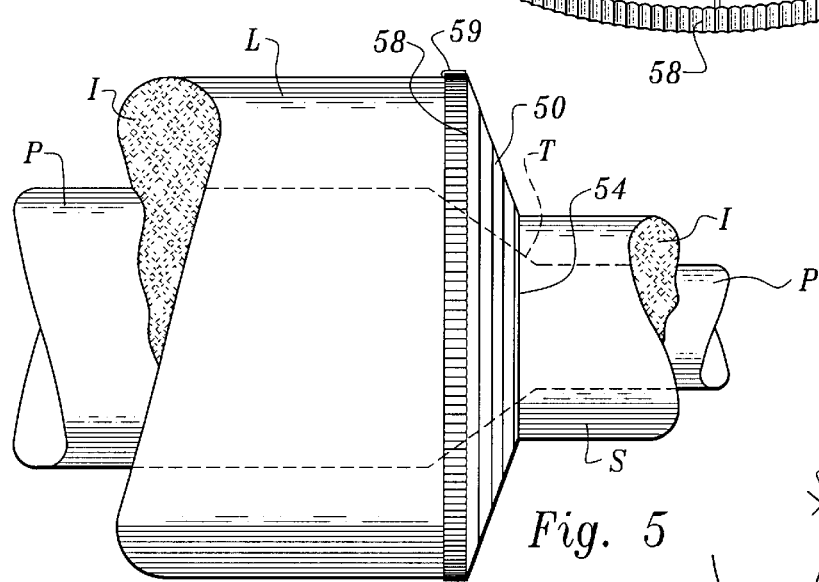
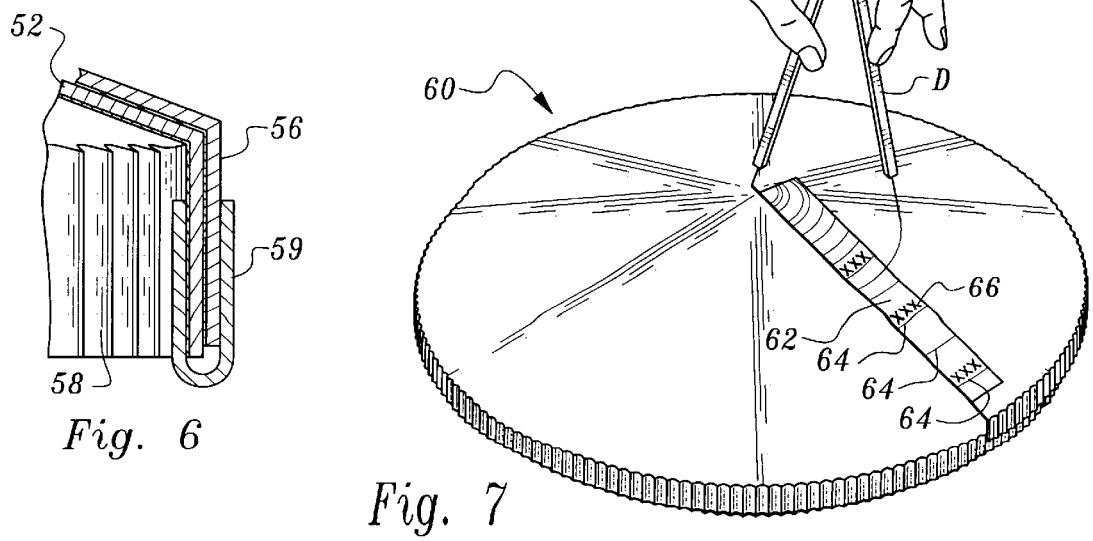

ADJUSTABLE ADAPTER FOR PIPE INSULATION CLADDING

FIELD OF THE INVENTION

The following invention relates to adapters for joining generally tubular structures of different diameters together. More particularly, this invention relates to blanks readily modifiable to become adapters of different sizes to join generally tubular structures of different diameters, such as pipe insulation cladding.

BACKGROUND OF THE INVENTION

Pipes and other fluid transportation conduits are often designed to require or benefit from insulation surrounding an exterior thereof. Such insulation is typically provided to reduce heat transfer out of or into the pipe, but could additionally be provided for acoustic, vibration or other isolation purposes. Often the insulation material to be utilized is susceptible to damage from exposure to the surrounding environment. To avoid such damage to the insulation and maintain the thermal integrity of the insulation system, cladding is often employed to protect the insulation. Such cladding additionally can provide a desirable aesthetic appearance.

Most commonly, pipe insulation cladding is thin sheet metal (often aluminum, but potentially any thermal jacketing material including stainless steel or PVC) provided in tubular sections of convenient lengths and diameters to surround pipes and their associated insulation. The cladding can thus be installed with a minimum of on-site modification to the cladding by the installer.

One difficulty in installing such cladding is encountered when the pipe, and hence the surrounding insulation, transitions from one diameter to another diameter. The tubular cladding sections adjacent such a transition have different diameters, resulting in a discontinuity in the cladding. An adapter must be provided to cover this discontinuity and join the adjacent cladding sections of different diameters together.

Typically, the prior art method for providing such an adapter has involved starting with a plain flat sheet of cladding material and utilizing various cutting and bending tools to form an adapter, such as one having a desirable conical taper to mate adjacent sections of different diameter cylindrical cladding together. Such custom manufacture of adapters is particularly difficult and time consuming, decreasing the efficiency with which cladding is installed.

In addition to the pipe cladding example provided above, other situations exist where generally tubular structures of differing diameters are to be joined together and a need exists for a method and apparatus for conveniently forming such adapters in a fashion other than custom manufacture of adapters from flat materials. For instance, air handling duct sections of different sizes require adapters to join them together.

SUMMARY OF THE INVENTION

With this invention, an adapter blank is provided which is ready for final simple modification into a finished adapter for joining two adjacent structures of differing diameter. The adapter blank includes a tapering wall, typically of conical or frustoconical form with a rim defining a largest diameter portion of the adapter blank. The rim is typically circular and exhibits a substantially constant diameter matching a diameter of the larger pipe cladding adjacent the transition where the adapter is to be placed. To accommodate the various different sizes of larger diameter cladding, multiple different adapter blanks would be provided with each adapter blank having a rim diameter corresponding with larger diameter cladding sizes in general use.

The adapter blank preferably includes an overlapping edge extending away from the rim. The overlapping edge defines a region of the tapering wall where the tapering wall overlaps itself.

The tapering wall also includes graduations which are visually perceptible on the tapering wall. The graduations are each spaced a different distance away from the rim and maintain a constant perpendicular distance away from the rim. The graduations can completely circumscribe the tapering wall of the adapter blank or can be provided as points or extending for only a short distance along the tapering wall. A divider or other marking tool can then be utilized to extend graduations to completely circumscribe the conical wall.

Preferably indicia, such as numbers, are located adjacent at least some of the graduations with the numbers representing the diameter of smaller cladding adjacent the transition in which the adapter is to be utilized. A user can thus merely select the adapter blank having the rim diameter matching the larger diameter cladding and then cut the adapter blank along the graduation having the size, as indicated by the indicia, which corresponds with a diameter of the smaller diameter cladding. Once this cut has been completed, the adapter blank has been transformed into the finished adapter having a frusto-conical wall and appropriately sized for use to join the cladding sections of different diameters together.

OBJECTS OF THE INVENTION

Accordingly, a primary object of the present invention is to provide an adapter for joining cladding of different diameters together.

Another object of the present invention is to provide a tapering adapter with an adjustable smaller diameter edge size for use in joining tubular structures of differing diameters together.

Another object of the present invention is to provide an adapter blank which can be readily modified to have appropriate diameters for joining tubular structures of different diameters together.

Another object of the present invention is to provide an adapter blank which has a fixed large diameter rim but with a modifiable smaller diameter edge to flexibly provide an adapter adjustable for use to join tubular structures of differing diameters together.

Another object of the present invention is to provide an adapter blank which requires only limited simple steps of final modification to provide a finished blank ready for installation.

Other further objects of the present invention will become apparent from a careful reading of the included drawing figures, the claims and detailed description of the invention.

BRIEF DESCRIPTION OF THE DRAWINGS

FIG. 4 is a perspective view of a finished adapter according to this invention after completion of the cutting step of FIG. 3 to provide the inner edge of the finished adapter.

FIG. 5 is a side elevation view of the finished adapter in place joining large cladding and small cladding together.

FIG. 6 is a sectional view taken along line 6—6 of FIG. 4.

FIG. 7 is a perspective view of an alternative adapter blank with the graduations provided upon a ruler strip attached to the conical wall of the blank and illustrating a method of completing formation of a circular graduation with the use of a divider.

DESCRIPTION OF THE PREFERRED EMBODIMENT

Figure 1:
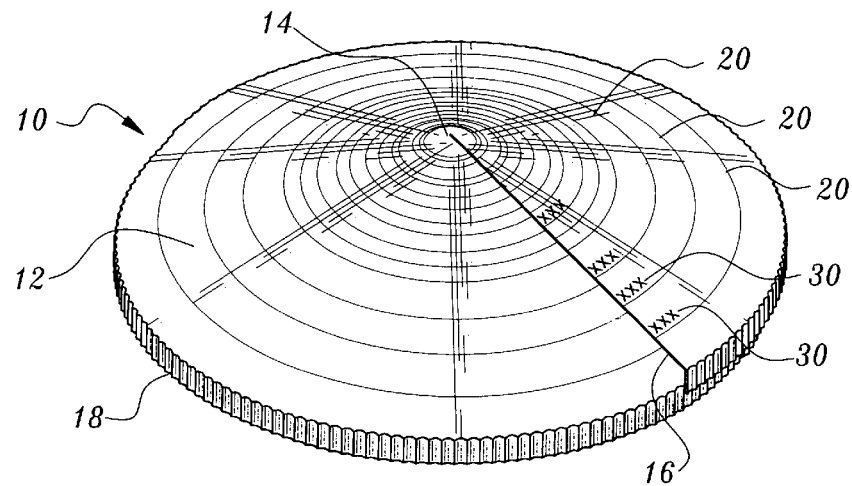
FIG. 1 is a perspective view of the adapter blank of this invention before adjustment and with graduations that are in the form of visible lines on the conical wall thereof.

Referring to the drawings, wherein like reference numerals represent like parts throughout the various drawing figures, reference numeral 10 (FIGS. 1–3) is directed to an adapter blank 10 which is adjustable to adjoin tubular structures, such as pipe insulation cladding of differing diameters L, S (FIG. 5) together. A large diameter rim 18 of the adapter blank 10 remains fixed. A smaller diameter for a finished adapter 50 (FIG. 4) is provided by cutting the adapter blank 10 along an appropriate graduation 20 (FIG. 3) to form the finished adapter 50 out of the adapter blank 10.

Figure 2:
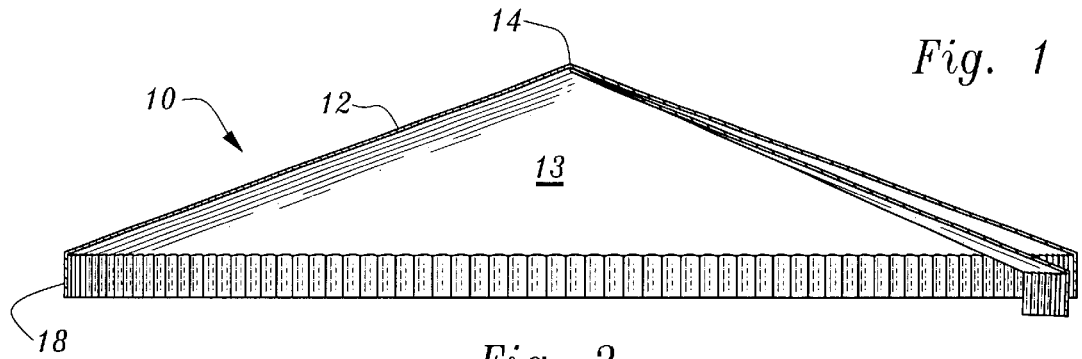
FIG. 2 is a full sectional view of that which is shown in FIG. 1.
Figure 3:
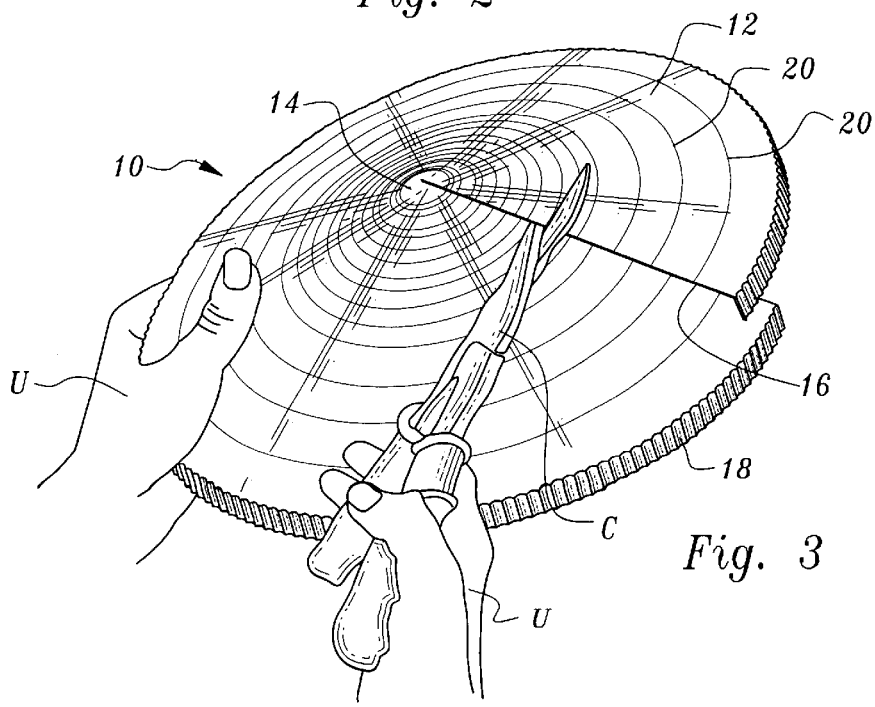
FIG. 3 is a perspective view of that which is shown in FIG. 1 with the process of modifying the adapter blank to form the inner edge of the finished adapter beginning.

In essence, and with particular reference to FIGS. 1–3, basic details of the adapter blank 10 are described. The adapter blank 10 is preferably a substantially rigid construct formed from thin sheet metal or similar material. A conical wall 12 tapers at a preferably constant angle from a tip 14 to a rim 18. An overlapping edge 16 defines a region where the conical wall 12 overlaps itself. Concentric lines 20 provide a preferred form of graduations which are visible on the conical wall 12. Indicia 30, such as numbers, are printed adjacent at least some of the lines 20. The lines are provided at typical standard diameters for smaller diameter pipe cladding S (FIG. 5) with indicia 30 indicating which graduation 20 corresponds with which smaller diameter pipe cladding S. A user thus merely cuts the adapter blank 10 along the line 20 having the indicia 30 representative of the smaller diameter pipe cladding S adjacent to which the adapter 50 is to be installed. Once this cutting procedure (FIG. 3) is complete, the finished adapter 50 (FIG. 4) is provided appropriately sized for installation between large cladding L (FIG. 5) and small cladding S.

More specifically, and with particular reference to FIGS. 1–3, specific details of the adapter blank 10 are described. While the adapter blank 10 can be formed from various different materials and formed by various different methods, the adapter blank 10 is preferably formed from aluminum sheet metal. To form the adapter blank 10, typically a circular sheet of aluminum starter material is first provided. The diameter of this starter sheet is larger than a diameter desired for the rim 18. A crimping tool is then utilized such as Model 0581 provided by the Roper Whitney Company of Rockford, Ill. Such a crimping tool both provides a crimping undulating pattern to the crimped rim 18 and bends the crimped rim 18 into a generally cylindrical form. This crimping tool also imparts a conical taper to the circular starting material. Before the crimping operation begins, a slit is cut from the circular edge of the starter material to a center of the circle. When the crimping tool is then utilized, the starter material automatically begins overlapping along this slit. While the undulating pattern on the rim 18 resulting from crimping is shown, the rim 18 can have other non-crimped forms. For instance, the rim 18 can be flanged radially away from a center line of the blank 10, notched to allow the rim 18 to fold somewhat with or without overlapping, or be formed to have a folded edge often referred to as a "Pittsburgh locked edge," or be pressed smooth.

When the crimping tool has circumnavigated the circular starting material, the material has taken the geometric form of the adapter blank 10 (FIG. 1). While the starter material is preferably a single unitary mass of sheet-like material, the starter material can be in the form of two or more separate masses of sheet-like material joined together to form the adapter blank 10. Multiple slits and fasteners would typically be used in such an embodiment.

The configuration of the crimping tool will determine the angle of taper imparted upon the adapter blank 10. This amount of taper will also dictate an amount of overlap in the adapter blank 10. It is conceivable that the circular starting material could have a wedge cut out of it, rather than merely a slit, such that the amount of overlap would be reduced. Also, a circular hole could be cut in a center of the starting material so that the adapter blank 10 would be frusto-conical after the crimping procedure is complete.

The lines 20 or other graduations are preferably in the form of grooves carved into a top side of the conical wall 12. The graduations can alternatively be formed by printing, stamping, laser or plasma marking or otherwise marked or labeled. These lines 20 can be provided on the circular starting material before the crimping procedure or can be cut into the top side of the conical wall 12 after the crimping procedure has formed the geometric structure of the adapter blank 10. While the lines 20 are shown on the top surface of the cylindrical wall, alternatively or in addition, the lines or other graduations can be placed on the inside surface 13 (FIG. 2). Typically, the inside surface 13 is provided with a vapor barrier, typically in the form of a taper-like layer. The lines 20 or other graduations could be printed directly on this layer or otherwise marked upon or carved into this layer.

While the crimping procedure described above provides a preferred method for forming the adapter block 10, the adapter block 10 could similarly be provided by a stamping procedure or other forming procedure. The adapter block 10 could be provided from a variety of different materials, for example galvanized steel, stainless steel, tin; or various non-metals, provided they are cuttable.

When the adapter blank 10 is formed as described above, the overlapping edge 16 extends linearly from the crimped rim 18 to the tip 14. However, it is not strictly necessary that the overlapping edge 16 extend linearly.

While the graduations are preferably in the form of lines 20, the graduations could be in the form of other markings or visually perceptive matter including dashed lines, color variation boundaries or other markings to visually guide a user in appropriately cutting the adapter blank 10.

While the adapter blank 10 preferably has a conical wall 12, forming either a complete cone or a frusto-conical cone section, the adapter blank 10 could alternatively have a tapering wall which tapers in a non-linear fashion from a larger diameter at the crimped rim 18 to the tip. The adapter blank 10 preferably extends all the way to the tip 14. However, the adapter blank 10 could be frusto-conical or otherwise tapering to an inner edge having a lesser diameter than that of the rim 18. Such a frusto-conical initial adapter blank variation would typically have an inner edge formed into the adapter blank 10 which would correspond with a smallest expected small cladding S (FIG. 5) diameter. If the small cladding S is larger, than the appropriate lines 20 or other graduations would be utilized to cut the adapter blank further until appropriately sized. Hence, the additional adapter blank 10 can have a conical wall 12 that is either completely conical or only frusto-conical; or have a tapering wall which tapers in a nonlinear fashion either from a larger diameter rim to a central tip or from a larger diameter rim to a smaller diameter inner edge.

While the adapter blank 10 preferably is substantially radially symmetrical about a central axis passing through a center of the rim and through the tip 14 (or smaller diameter edge) the adapter blank 10 can be provided with a non-radially symmetrical form of any desired shape. When the adapter blank 10 is for use in joining pipe insulation cladding surrounding a jog in a pipe or a reduction in pipe diameter to a transition region which is non-frustoconical, it is desirable to have an adapter blank which is eccentric in form. Particularly, the adapter blank in such an eccentric embodiment would include two center lines which are parallel to each other with the first center line passing through a center of the rim and the second center line passing through the tip (or center of a smaller diameter edge in the case of a frusto-conical eccentric adapter blank). Cross-sections of such an eccentric adapter would exhibit center lines which are between the rim center line and the tip center line. Thus, the angle of taper exhibited by the tapering wall of such an eccentric adapter would vary on the different sides of the eccentric adapter. Such an eccentric adapter blank could include either a linearly tapering wall or a non-linearly tapering wall.

The indicia 30 (FIG. 1) is preferably in the form of numbers corresponding with the diameter of the small cladding S (FIG. 5) desired for mating adjacent the finished adapter 50. For simplicity, the indicia 30 shown in FIG. 1 are merely shown as "xxx." Most preferably, this indicia would be numbers representative of inches, meters, standard pipe size numbers, letters or other codes.

The indicia 30 are located adjacent a line 20 or other graduation at which the cutting tool should operate to provide the inner edge 54 (FIG. 4) with the desired size. It is worth noting that the indicia 30 (when in the form of actual diameter measurements) would typically represent the diameter of the small cladding S, which would not correspond with the linear distance along the surface of the tapering conical wall 12, but would rather represent a distance perpendicular to a central axis of the adapter blank 10. Hence, the indicia 30 would be distinct in proportion to indicia and graduations such as those which would be provided on a standard measuring ruler. By providing the indicia 30 in this fashion, the user avoids the need to perform trigonometric calculations to ensure that the proper size is provided for the finished adapter 50.

With particular reference to FIGS. 4–6, specific details are provided for the finished adapter 50 after completion of the cutting step shown in FIG. 2. The finished adapter 50 is identical to the adapter blank 10 except that a central portion of the adapter blank 10 has been cut away. Particularly, the finished adapter 50 includes a frusto-conical wall 52, or other tapering wall, extending from an inner edge 54 to the crimped rim 58. An overlapping edge 56 extends from the inner edge 54 to the crimped rim 58. A clip 59 is provided along the crimped rim 58 to secure the overlapping edge 56 to portions of the frusto-conical wall 52 adjacent the overlapping edge 56 (FIG. 6). The clip 56 can be in the form of a spring steel or a malleable metal which can be crimped to hold the overlapping edge 56 to underlying portions of the frusto-conical wall 52. As an alternative to the clip 59, an adhesive can be utilized or the overlapping edge 56 can be closely held in place during the attachment to the large cladding L and small cladding S (FIG. 5). Similarly, the clip 59 can be replaced or supplemented with one or more screws, rivets, adhesive tape or any other fastener effective for this purpose.

The finished adapter 50 has an inner edge 54 with a diameter which has been adjusted specifically to match the diameter of the small cladding S (FIG. 5). In contrast, the crimped rim 58 of the finished adapter 50 has remained fixed. To provide a user with all typically needed adapters, a set of adapter blanks 10 would initially be provided. This set of adapter blanks 10 would vary by crimped ring 18 diameter so that the user could select an adapter blank 10 having the crimped rim 18 of desired diameter to match the diameter of the large cladding L (FIG. 5).

Additionally, the set of adapter blanks 10 could include adapter blanks having different conical tapering angles or other non-conical tapering configurations. However, such a set of adapter blanks 10 would be significantly less than that which would be required if the set of adapter blanks 10 needed to additionally include all possible appropriate inner edge 54 (FIG. 4) diameters. This smaller subset of adapter blanks 10 would allow a user U to conveniently carry in inventory all of the various adapter blank 10 sizes and then with a single quick cutting procedure (FIG. 3) have a finished adapter 50 precisely sized as desired.

In use and operation, and with particular reference to FIGS. 3 and 5, details of the method of forming the finished adapter 50 from the adapter blank 10 are described. Initially, the user selects an adapter blank 10 having a crimped rim 18 with a diameter matching that of large cladding L (FIG. 5) adjacent to which the finished adapter 50 is to be deployed. The user U then identifies the line 20 or other graduation which has a diameter matching the diameter of the small cladding S (FIG. 5) adjacent to which the finished adapter 50 is to be placed. The user U then utilizes an appropriate cutting tool C (FIG. 3) to cut along the line 20 or other graduation which has been identified. When this cutting procedure is completed, the inner edge 54 has been provided for the finished adapter 50. The finished adapter 50 can then be appropriately closed with the clip 59 and attached to the large cladding L and small cladding S surrounding a pipe P with insulation I between the cladding L, S and the pipe P, such as would typically be needed adjacent a transition T in the diameter of the pipe P.

While the adapter blank 10 has been primarily described in the preferred embodiment for use in joining together tubular structures of different diameters, such as pipe insulation cladding, the adapter blanks 10 can be used in numerous other related ways. For instance, when a pipe, tank or other vessel is insulated and the pipe, tank or other vessel terminates at a particular location (i.e. an end of the pipe, a top or bottom of a tank or an end of a vessel) the adapter blank 10 can be utilized to terminate cladding surrounding such a structure. With such a use for the adapter blank 10, the adapter blank 10 would typically not be modified at all, but would maintain its form extending from the rim 18 to the tip 14.

Also, the adapter blank 10 can be used where the insulation cladding is to end but a pipe within the insulation is to extend out of the cladding. In such a configuration, the adapter blank 10 would be cut with an inner edge diameter matching a diameter of the pipe rather than matching a diameter of cladding to surround the pipe.

Similarly, in a side wall of cladding, especially cladding of a large diameter or which exhibits a flat surface, it is often desirable to provide a recess through the cladding and into the insulation either partially into the insulation or all the way through to the underlying pipe or other structure being insulated. For instance, if a view port or gauge on the pipe or other structure being insulated needs to remain visible, it is desirable that the cladding recess down about such a location to provide visual access to such a region and fully contain the insulation.

An adapter blank 10 can be used in a somewhat reverse fashion with the inner edge diameter cut to match a diameter of the exposed or less insulated surface of the pipe or other structure and with a depth from the rim to the inner edge similar to a thickness of the insulation. The adapter blank 10 is then ready for use with the rim adjacent the surface of the cladding and with the inner edge adjacent the pipe or other structure so that direct access to the pipe or other structure within the insulation is provided through the appropriately modified adapter blank with the surface of the pipe or other structure visible and with the insulation fully contained within the cladding.

The adapter blank 10 can provide some assistance to a cladding professional who is cladding pipes adjacent a wye, tee, or other junction in a pipe or other tubular structure. For instance, when a pipe to be insulated includes a wye, the adapter blank 10 can first be modified by cutting to form the inner edge on the adapter blank 10, similar to that of the finished adapter 50. A portion of the finished adapter 50 adjacent the rim 58 can then be cut in a custom fashion to provide an elliptical modified rim which can join cladding surrounding the main pipe from which the branch/wye off of the main pipe extends. In such a situation, the adapter blank 10 simplifies somewhat the process of cladding such a junction.

Also, where a duct or other conduit transitions from a square or rectangular cross-section to a round cross-section, the adapter blank 10 can be utilized to form at least a portion of an adapter to provide a transition in cladding surrounding such a transition structure. With additional modification in the adapter blank 10, such as to replace the rim with square or rectangular cross-sections of various different standard sizes, the benefit of the adapter blank in such an installation can be particularly enhanced.

With particular reference to FIG. 7, an alternative adapter blank 60 is described. The alternative adapter blank 60 is similar to the adapter blank 10 in the preferred embodiment except that the conical wall is not provided with graduations completely circumscribing the blank 60. Rather, a ruler strip 62 is provided extending away from the rim. This ruler strip 62 includes lines 64 or other graduations thereon, preferably by printing with indicia 66, preferably in the form of numbers adjacent at least some of the graduations. The ruler strip 62 can be replaced with markings of limited length marked in a permanent or temporary fashion upon the blank 60. A user U utilizes a divider D with one end of the divider D at a tip of the blank 60 and another end of the divider D adjusted until it is located directly adjacent the line or other graduation representative of the desired small cladding S diameter.

The divider D is then rotated about the tip. The end of the divider opposite the tip can be provided with a sharp point to carve a visible groove in the conical wall or can be provided with a writing tool to draw a line or other graduation on the conical wall. The alternative adapter blank 60 is then cut in a fashion similar to that depicted in FIG. 3 until a finished adapter similar to that shown in FIG. 4 is provided. The alternative adapter blank 60 of FIG. 7 provides an aesthetically unique smooth surface without any visible graduations thereon. The ruler strip 62 can be provided in a removable adhesive fashion for convenient placement upon the blank 60 and removal from the blank 60 after the blank has been modified as desired to provide a finished adapter. In this way, a completely unmarked surface can be provided with the alternative adapter blank 60.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure.

What is claimed is:

1. A blank for creation of a frusto-conical adapter, such as for use between large and small diameter pipe cladding to be joined, the blank comprising in combination:

a conical wall having a rim with a diameter substantially matching the large diameter pipe and an overlapping edge-extending away from said rim; and at least one visible graduation on said conical wall, said at least one graduation located a substantially constant perpendicular distance radially inwardly from said rim and perpendicular to said rim at a location corresponding with the small diameter pipe.

2. The blank of claim 1 wherein said conical wall includes a tip opposite said rim.

3. The blank of claim 2 wherein said overlapping edge extends perpendicularly from said rim to said tip.

4. The blank of claim 3 wherein said rim is crimped and extends generally cylindrically away from said tip.

5. The blank of claim 4 wherein a clip is coupled to said rim adjacent said overlapping edge to hold said overlapping edge of said conical wall adjacent portions of said conical wall overlapped by said overlapping edge.

6. The blank of claim 1 wherein said rim is substantially circular in cross-section with a substantially constant diameter.

7. The blank of claim 6 wherein said conical wall includes a plurality of circular graduations concentric with said rim.

8. The blank of claim 7 wherein a visible indicium is located adjacent at least one of said graduations.

9. The blank of claim 8 wherein a plurality of indicia are located upon said conical wall, each of said plurality of indicia located adjacent one of said graduations.

10. The blank of claim 9 wherein each said indicia is a number representing a diameter of one of said graduations adjacent each said indicia.

11. The blank of claim 1 wherein said conical wall includes a plurality of graduations on said conical wall, each said graduation in the form of a line with each said graduation located a different constant distance away from said rim and extending at least partially around said conical wall.

12. The blank of claim 11 wherein said graduations are formed directly into a material forming said conical wall.

13. The blank of claim 11 wherein said graduations are located upon a strip of material coupled to said conical wall.

14. The blank of claim 1 wherein a visible indicium is located adjacent at least one of said graduations.

15. The blank of claim 14 wherein each said indicia is a number representing a diameter of one of said graduations adjacent each said indicia.

16. The blank of claim 15 wherein said conical wall includes a plurality of graduations on said conical wall, each said graduation in the form of a line with each said graduation located a different constant distance away from said rim and extending at least partially around said conical wall.

17. The blank of claim 1 wherein said conical wall is formed from a unitary mass of sheet-like metallic material.

18. A blank for manufacture of an adapter to join adjacent structures of different diameters including a first generally tubular structure having a first diameter and a second generally tubular structure having a second diameter, the blank comprising in combination:
- a tapering conical wall having a rim with a substantially constant rim diameter substantially matching the first diameter of the first structure to be joined;
- said tapering wall including an overlapping edge extending away from said rim; and
- at least one visible graduation on said tapering wall, said at least one visible graduation located radially inwardly from said rim and a substantially constant perpendicular distance from said rim at a location corresponding with the second diameter of the second structure to be joined.

19. The blank of claim 18 wherein said tapering wall includes a tip opposite said rim, said overlapping edge extending from said rim to said tip.

20. The blank of claim 18 wherein said at least one visible graduation circumscribes said tapering wall and maintains a substantially constant distance away from said rim.

21. The blank of claim 20 wherein said at least one visible graduation is a line.

22. The blank of claim 18 wherein said at least one visible graduation is a groove formed directly in a material forming said tapering wall.

23. The blank of claim 18 wherein said graduation is printed directly upon said tapering wall.

24. The blank of claim 18 wherein said graduation is located on a strip of material coupled to said tapering wall.

25. The blank of claim 18 wherein said at least one visible graduation includes at least one mark taken from the group of marks including lines, dots, dashes and combinations thereof.

26. The blank of claim 18 wherein an indicium is located adjacent said at least one visible graduation.

27. The blank of claim 26 wherein said indicium is a visible number representative of the second diameter of the second adjacent structure to be joined.

28. A method for forming an adapter to join a first generally tubular structure of a first diameter to a second generally tubular structure of a second diameter, including the steps of:
- providing a blank including a tapering conical wall having a rim with a substantially constant diameter substantially matching the first diameter of the first generally tubular structure to be joined, the tapering wall including an overlapping edge extending away from the rim, and at least one visible graduation on the tapering wall, the at least one visible graduation located radially inwardly from the rim and a substantially constant perpendicular distance from the rim at a location corresponding with the second diameter of the second generally tubular structure to be joined; and
- cutting the blank along the at least one visible graduation to provide an upper edge to the tapering wall having a diameter matching the second diameter of the second generally tubular structure to be joined.

29. The method of claim 28 including the further steps of providing a plurality of graduations on the tapering wall, each graduation maintaining a different constant distance away from the rim; and
- selecting an appropriate one of the plurality of graduations with a diameter matching the second diameter of the second generally tubular structure for use in guiding a cutting tool during said cutting step.

30. The method of claim 29 including the further step of providing indicia adjacent at least one of the graduations, each indicium in the form of a visible number representative of the diameter of the graduation adjacent the indicium.

31. A method for forming an adapter to join a first generally tubular structure of a first diameter to a second generally tubular structure of a second diameter, including the steps of:
- providing a blank including a tapering conical wall having a rim with a diameter substantially matching the first diameter of the first generally tubular structure to be joined, the tapering wall including an overlapping edge extending away from the rim, and at least one visible graduation on the tapering wall, the at least one visible graduation located spaced from the rim at a location corresponding with the second diameter of the second generally tubular structure to be joined;
- cutting the blank along the at least one visible graduation to provide an upper edge to the tapering wall having a diameter matching the second diameter of the second generally tubular structure to be joined;
- wherein said providing step includes the step of limiting the at least one graduation to less than an entire circuit around the tapering wall;
- using a divider with ends a constant distance from each other with one end adjacent a tip of the tapering wall opposite the rim and the other end of the divider adjacent a graduation having a diameter matching the second diameter of the second generally tubular structure; and
- rotating the divider about the tip to draw the second end of the divider around the tapering wall in a fashion leaving a visible mark on the tapering wall circumscribing the tapering wall, the visible mark for use in guiding a cutting tool during said cutting step.

32. The method of claim 31 including the further step of placing the graduations on a strip of material attached to the tapering wall.

33. A blank for use in manufacture of sheet-like jacketing for pipes, tanks, vessels and the like, said blank formed into an adapter to join adjacent structures of different diameters including a first generally tubular structure having a first diameter and a second generally tubular structure having a second diameter, the blank comprising in combination:
- a tapering conical wall having a rim and a tip opposite said rim with a diameter substantially matching the large diameter pipe;
- said tapering wall including an overlapping edge extending from said rim to said tip; and
- wherein said tapering wall includes at least one visible graduation, said at least one visible graduation located radially inwardly from said rim a substantially constant perpendicular distance away from said rim in a direction perpendicular to said rim at a location corresponding with the small diameter pipe.

34. The blank of claim 33 wherein said at least one visible graduation extends entirely around said tapering wall.

35. The blank of claim 33 wherein said tip is aligned with a centerline passing through a center of said rim perpendicularly, said rim having a circular cross-section, such that said tapering wall is substantially radially symmetrical.

36. A method for forming an adapter to join a first generally tubular structure of a first diameter to a second generally tubular structure of a second diameter, including the steps of:

providing a blank including a tapering conical wall having a rim with a diameter substantially matching the first diameter of the first generally tubular structure to be joined, the tapering wall including an overlapping edge extending away from the rim, and at least one visible graduation on the tapering wall, the at least one visible graduation located spaced from the rim at a location corresponding with the second diameter of the second generally tubular structure to be joined;

cutting the blank along the at least one visible graduation to provide an upper edge to the tapering wall having a diameter matching the second diameter of the second generally tubular structure to be joined;

using a divider with ends a constant distance from each other with one end adjacent a tip of the tapering wall opposite the rim and the other end of the divider adjacent a graduation having a diameter matching-the second diameter of the second generally tubular structure; and rotating the divider about the tip to draw the second end of the divider around the tapering wall in a fashion leaving a visible mark on the tapering wall extending along the tapering wall, the visible mark for use in guiding a cutting tool during said cutting step.

37. The blank of claim 1 wherein said rim has a substantially constant size, such that said visible graduations remain substantially constant in size.

38. The blank of claim 1 wherein said conical wall has a fixed angle relative to said rim.

* * * * *